P. L. KIMBALL.
MILK FEED REGULATOR FOR CREAM SEPARATORS.
APPLICATION FILED FEB. 26, 1915.
1,146,579.
Patented July 13, 1915.
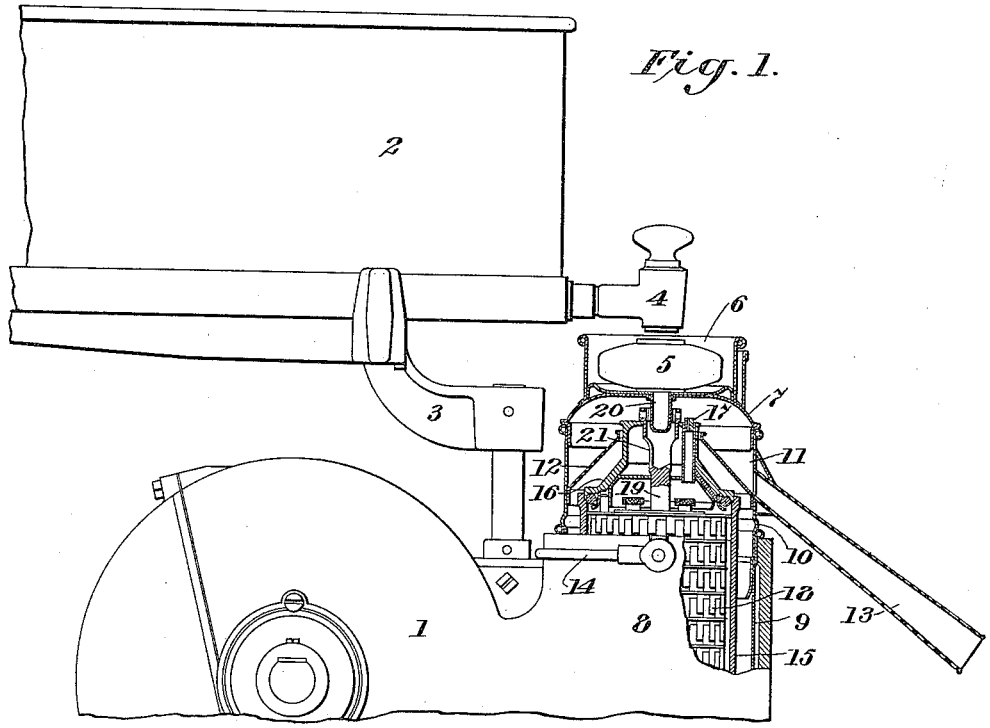
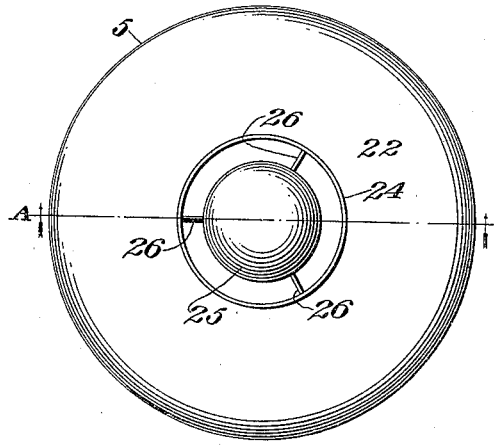
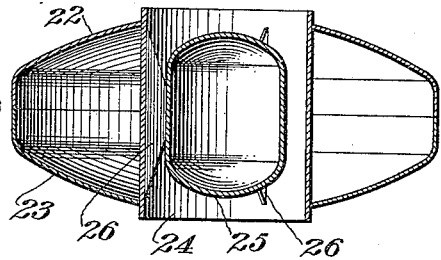
Witnesses
W. N. Finckel Jr.
Lillie M. Kesler.
Inventor
Perley L. Kimball
by
W. N. Finckel
Attorney

UNITED STATES PATENT OFFICE.

PERLEY L. KIMBALL, OF BELLOWS FALLS, VERMONT, ASSIGNOR TO VERMONT FARM MACHINE COMPANY, OF BELLOWS FALLS, VERMONT, A CORPORATION OF VERMONT.

MILK-FEED REGULATOR FOR CREAM-SEPARATORS.

1,146,579.  Specification of Letters Patent.  Patented July 13, 1915.

Application filed February 26, 1915. Serial No. 10,859.

*To all whom it may concern:*

Be it known that I, PERLEY L. KIMBALL, a citizen of the United States, residing at Bellows Falls, in the county of Windham and State of Vermont, have invented a certain new and useful Improvement in Milk-Feed Regulators for Cream-Separators, of which the following is a full, clear, and exact description.

This invention relates to centrifugal cream separators, and more particularly to milk-feed regulators or floats used in such separators for controlling the quantity of milk supplied from the receiving can to the separator bowl. Floats of this description now commonly in use have a stem which extends up into the faucet of the receiving can and keeps them centered beneath it and in line of the milk outlet; but this stem, so extended, makes the removal and replacing of the removable parts of the separator inconvenient. Another type of float also in use has no stem, but its shape causes it to bob about beneath the milk outlet or faucet of the receiving can, so that its proper operation to automatically cut off the supply of milk when conditions require, cannot be depended upon. The float of this invention avoids both of these objections, and moreover allows the milk to feed steadily, and cuts off the flow positively when required, and also obviates frothing of the milk which is a common fault more or less present in the use of the prior art floats to me known.

The invention consists in a float comprising a buoyant body, elliptical in cross-section, and having a central opening in which is supported a stopper or valve for the milk outlet or faucet, which stopper or valve is spaced apart from the main body of the float, and also acts as a subsidiary float. In the preferred construction the float is made reversible, and will operate equally well regardless of which side is uppermost.

In the accompanying drawings illustrating the invention, in the several figures of which like parts are similarly designated, Figure 1 is a sectional elevation of such parts of a cream separator of well-known type as are necessary to show the location and operation of the float. Fig. 2 is a top plan view of the float, and Fig. 3 is a transverse vertical section taken substantially in the plane of line A, B, Fig. 2.

1 is a portion of the frame of a cream separator of well-known type, upon which is removably mounted the milk receiving can 2, by means of a bracket 3 upon which the can 2 may be slid back and forth.

4 is the outlet faucet or cock of the can 2. Directly beneath this faucet is the float 5 of this invention and presently described in detail. This float operates in a feed cup or receptacle 6 arranged on the top of the cream pan cover 7.

A cylindrical extension 8, open at its top, is formed on the separator frame 1, and in this is placed a liner 9 within which fits an extension 10 of the cream pan 11. In the top of this cream pan 11 is fitted the cream pan cover 7 above referred to. Within the cream pan is a conical partition 12 adapted to cause the separated cream to flow out of a spout 13 from the mouth of which it is collected. The liner 9 has any suitable device 14 by which it may be handled.

Within the liner 9 in the extension 8, is revolubly mounted the separator bowl 15, having a cover 16 in which is the adjustable cream-screw 17 through which the cream is ejected into the cream pan 11 by centrifugal force as the separator bowl is revolved. Within the separator bowl and turning with it, is the skimmer 18 of approved construction. The separator bowl 15 and its associated parts are mounted upon a vertical shaft (not shown) rotated by suitable gearing, and this shaft carries a bolt or rod 19 adapted to hold in place the separator bowl cover 16 and the parts contained in the separator bowl. This bolt or rod 19 has its upper end hollow to receive a short spout 20 which depends from the cream pan cover 7, and said hollow end is ported, as at 21, to allow the milk which flows into the separator bowl through the spout 20 to have free access to said bowl.

The body of the float 5 may be and is here shown as formed of halves 22 and 23 soldered or otherwise suitably united in an air-tight manner. This float preferably is annular, and elliptical in cross-section, as shown in Figs. 2 and 3. Through the center of the float body extends an opening fitted with a tube 24 which extends a slight distance above and below the surface of the float body so as to center it beneath the faucet 4. This opening is vertical when the float is in operative position and forms a milk flow passage, and its area in cross-section is substantially double the area of the opening in the faucet, so as to insure a free flow of the milk. In the tube 24 is arranged a stopper or valve 25 serving also in part as a subsidiary float. This stopper or valve is composed of a cylindrical body, having similar convex ends, and, is, of course, hollow. It is of less diameter than the tube 24 so as to leave a space all around it between itself and the tube, and it is supported in the tube 24 preferably midway of its length and wholly within it by means of webs 26, preferably three, though more or fewer might be used. These webs are very thin and have slanting or beveled top and bottom edges converging toward the points at which the webs are joined to the stopper or valve 25, so as to present the least possible resistance to the flow of the milk. The convex ends of the stopper or valve 25 are some distance within the ends of the tube 24, and are thus protected from being dented which would detract from their proper functioning.

The operation is as follows:—Assuming that the separator is running, milk will flow from the receiving can 2 through faucet 4 into the feed cup or receptacle 6. Float 5 being at rest over the outlet spout 20, the milk will run down through the central tubular opening of the float and be evenly distributed around the circumference of the stopper or valve 25 by reason of the convex shape of its ends and the sloping edges of the webs 26 and will flow through spout 20 into the separator bowl 15, but spout 20 being smaller than the opening in faucet 4, the milk will rise in the feed cup or receptacle 6 and as its level rises the float will rise with it. If the flow of milk from receiving can 2 is too rapid, so that it would tend to overflow the receptacle 6, float 5 consequently rises and, being centered directly beneath faucet 4 by the evenly distributed flow of milk over and around the stopper or valve 25 and by the extension of tube 24, stopper or valve 25 will tend to partially or completely close the opening of the faucet 4 and temporarily retard or arrest the flow of milk. Obviously, when sufficient milk has flowed out of the feed cup or receptacle 6 through spout 20 to allow float 5 to drop away from the faucet, the full flow will be resumed. This operation is automatic and uniform during the operation of the separator.

In order to remove the float, cream pan, separator bowl, skimmer and sanitary liner when a float with a stem which projects into the receiving can faucet is used, it is necessary to tilt or raise the receiving can to an undesirable height so as to free the faucet from such stem, but with the float of this invention it is not necessary to raise the can at all; on the contrary, the can is simply pushed back on the bracket 3 until the faucet 4 is clear of the feed cup or receptacle 6, and then all the parts mentioned may be removed or replaced.

If the operation of the separator is arrested and milk remains in the receiving can, it may be prevented from flowing into the separator bowl by closing the faucet or cock 4.

By making the float reversible it is immaterial how it is placed in the receptacle in which it operates, since it is operative either side up, and hence the user of the machine is not required to adjust the float when putting it in place, thus simplifying the assembling of the parts.

Various details of construction of the float may be changed without departing from the scope of the appended claims.

What I claim is:—

1. A milk-feed regulator for cream separators, comprising a buoyant body having an opening extending through it, said opening provided with a tube, and a subsidiary float fixedly mounted in said tube.

2. A milk-feed regulator for cream separators, comprising a buoyant body having an opening provided with a tube extending through it, said tube extending above and below the outer surface of said body, and a buoyant valve mounted in and of less length than said tube.

3. A milk-feed regulator for cream separators, comprising an annular reversible float having an opening extending through its center, a valve within said opening, and means for supporting said valve within said opening.

4. A milk-feed regulator for cream separators, comprising a float, a tube extending through and above and below the surfaces of the float, a stopper wholly within said tube, and webs connected with said stopper and with said tube for supporting said stopper in said tube.

5. A milk-feed regulator for cream separators, comprising a float body having an opening provided with a tube forming a part of said body and extending above and below it, a subsidiary float arranged wholly within said tube, and webs connecting said tube and subsidiary float, said parts being alike at top and bottom so that the device may be used reversibly.

6. A milk-feed regulator for cream separators, comprising an annular reversible float having a central tubular opening, and a symmetrical convex-ended stopper or valve supported in said opening having its ends terminating a short distance within the ends of said opening.

7. A milk-feed regulator for cream separators, comprising an annular float body having a central tubular milk-flow passage which is vertical when the float is in operative position, said passage being of greater area in horizontal cross-section than the stream of milk which it regulates, and a convex-ended stopper or valve mounted wholly within said passage and having its ends substantially equidistant from the ends of said passage.

In testimony whereof I have hereunto set my hand this 24th day of February A. D. 1915.

PERLEY L. KIMBALL.

Witnesses:
J. S. LANGEVILL,
M. J. PIKE.

Copies of this patent may be obtained for five cents each, by addressing the "Commissioner of Patents, Washington, D. C."